(12) United States Patent
Rico Alvarino et al.

(10) Patent No.: US 10,454,646 B2
(45) Date of Patent: Oct. 22, 2019

(54) SOUNDING REFERENCE SIGNAL TRANSMISSIONS IN ENHANCED MACHINE TYPE COMMUNICATION

(71) Applicant: QUALCOMM Incorporated, San Diego, CA (US)

(72) Inventors: Alberto Rico Alvarino, San Diego, CA (US); Wanshi Chen, San Diego, CA (US); Hao Xu, San Diego, CA (US)

(*) Notice: Subject to any disclaimer, the term of this patent is extended or adjusted under 35 U.S.C. 154(b) by 137 days.

(21) Appl. No.: 15/339,132

(22) Filed: Oct. 31, 2016

(65) Prior Publication Data

US 2017/0141901 A1 May 18, 2017

Related U.S. Application Data

(60) Provisional application No. 62/255,451, filed on Nov. 14, 2015, provisional application No. 62/374,128, filed on Aug. 12, 2016.

(51) Int. Cl.
*H04L 5/00* (2006.01)
*H04W 4/70* (2018.01)
(Continued)

(52) U.S. Cl.
CPC .......... *H04L 5/0051* (2013.01); *H04L 5/0087* (2013.01); *H04W 4/70* (2018.02);
(Continued)

(58) Field of Classification Search
CPC ... H04L 5/0051; H04L 5/0087; H04L 5/0044; H04L 5/0053; H04L 5/0092;
(Continued)

(56) References Cited

U.S. PATENT DOCUMENTS 9,622,230 B2 4/2017 Chen et al.
2011/0292823 A1 12/2011 Barbieri et al.
(Continued)

FOREIGN PATENT DOCUMENTS

WO WO-2013173673 A2 11/2013

OTHER PUBLICATIONS

Partial International Search Report—PCT/US2016/059898—ISA/EPO—dated Jan. 23, 2017.
(Continued)

*Primary Examiner* — Eric Myers
(74) *Attorney, Agent, or Firm* — Patterson & Sheridan, L.L.P.

(57) ABSTRACT

Certain aspects of the present disclosure generally relate to wireless communications, and more specifically to sounding reference signal (SRS) transmissions in enhanced machine type communication (MTC). An example method generally includes determining one or more narrowband regions partitioned from wider system bandwidth for communicating with a base station, determining resources, within the one or more narrowband regions of a first subframe, for transmission of sounding reference signals (SRS) by the UE, deciding whether or not to transmit SRS on the determined resources of the first subframe, and transmitting or not transmitting the SRS on the determined resources of the first subframe based on the decision.

34 Claims, 7 Drawing Sheets

(51) Int. Cl.
*H04W 72/04* (2009.01)
*H04W 88/02* (2009.01)
*H04L 5/14* (2006.01)

(52) U.S. Cl.
CPC ....... *H04W 72/0446* (2013.01); *H04L 5/0044* (2013.01); *H04L 5/0053* (2013.01); *H04L 5/0058* (2013.01); *H04L 5/0092* (2013.01); *H04L 5/1469* (2013.01); *H04W 88/02* (2013.01)

(58) Field of Classification Search
CPC .. H04L 5/1469; H04W 4/70; H04W 72/0446; H04W 88/02
See application file for complete search history.

(56) References Cited

U.S. PATENT DOCUMENTS

2016/0249327 A1    8/2016  Chen
2017/0303241 A1*  10/2017  Yang ..................... H04W 72/04
2017/0367074 A1*  12/2017  Zhang .................. H04W 72/04

OTHER PUBLICATIONS

International Search Report and Written Opinion—PCT/US2016/059898—ISA/EPO—dated Apr. 11, 2017.

Samsung: "Link Adaptation for Low Cost UEs", 3GPP Draft, R1-152835, Link Adaptation, 3rd Generation Partnership Project (3GPP), Mobile Competence Centre, 650, Route Des Lucioles, F-06921 Sophia-Antipolis Cedex, France, vol. RAN WG1, No. Fukuoka, Japan, May 25, 2015-May 29, 2015, May 24, 2015 (May 24, 2015), XP050968312, Retrieved from the Internet: URL: http://www.3gpp.org/ftp/Meetings_3GPP_SYNC/RAN1/Docs/ [retrieved on May 24, 2015].
LG Electronics: "Details on SR, SRS, and SPS transmission for MTC UE," 3GPP Draft; R1-156848 SR and SRS V2, 3rd Generation Partnership Project (3GPP), Mobile Competence Centre ; Lucioles ; F-06921 Sophia-Antipolis Cedex ; France vol. RAN WG1, No. Anaheim, USA; Nov. 15, 2015-Nov. 22, 2015 Nov. 7, 2015 (Nov. 7, 2015), XP051022532 Retrieved from the Internet: URL:http://www.3gpp.org/ftp/tsg_ran/WG1_RL1/TSGR1 83/Docs/ [retrieved on Nov. 7, 2015] Sect. 3, 6 pages.
Partial International Search Report—PCT/US2016/059898—ISA/EPO—Jan. 23, 2017.
ZTE: "Remaining Issues on SRS Transmission for MTC Enhancement," 3GPP Draft; R1-156670-SRS, 3rd Generation Partnership Project (3GPP), Mobile Competence Centre ; Lucioles ; F-06921 Sophia-Antipolis Cedex ; France vol. RAN WG1, No. Anaheim, US; Nov. 15, 2015-Nov. 22, 2015 Nov. 7, 2015 (Nov. 7, 2015), XP051022432 Retrieved from the Internet: URL:http://www.3gpp.org/ftp/tsg_ran/WG1_RL1/TSGR1 83/Docs/ [retrieved on Nov. 7, 2015], 2 pages.

* cited by examiner

SOUNDING REFERENCE SIGNAL TRANSMISSIONS IN ENHANCED MACHINE TYPE COMMUNICATION

CLAIM OF PRIORITY UNDER 35 U.S.C. § 119

This application claims benefit of U.S. Provisional Patent Application Ser. Nos. 62/255,451 and 62/374,128, filed Nov. 14, 2015 and Aug. 12, 2016, respectively, which are herein incorporated by reference in their entirety.

I. FIELD OF THE INVENTION

Certain aspects of the present disclosure generally relate to wireless communications, and more specifically to sounding reference signal (SRS) transmissions in enhanced machine type communication (MTC).

II. DESCRIPTION OF RELATED ART

Wireless communication systems are widely deployed to provide various types of communication content such as voice, data, and so on. These systems may be multiple-access systems capable of supporting communication with multiple users by sharing the available system resources (e.g., bandwidth and transmit power). Examples of such multiple-access systems include code division multiple access (CDMA) systems, time division multiple access (TDMA) systems, frequency division multiple access (FDMA) systems, 3rd Generation Partnership Project (3GPP) Long Term Evolution (LTE) including LTE-Advanced systems and orthogonal frequency division multiple access (OFDMA) systems.

Generally, a wireless multiple-access communication system can simultaneously support communication for multiple wireless terminals. Each terminal communicates with one or more base stations via transmissions on the forward and reverse links. The forward link (or downlink) refers to the communication link from the base stations to the terminals, and the reverse link (or uplink) refers to the communication link from the terminals to the base stations. This communication link may be established via a single-input single-output, multiple-input single-output or a multiple-input multiple-output (MIMO) system.

A wireless communication network may include a number of base stations that can support communication for a number of wireless devices. Wireless devices may include user equipments (UEs). Machine type communications (MTC) may refer to communication involving at least one remote device on at least one end of the communication and may include forms of data communication which involve one or more entities that do not necessarily need human interaction. MTC UEs may include UEs that are capable of MTC communications with MTC servers and/or other MTC devices through Public Land Mobile Networks (PLMN), for example.

SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved communications between access points and stations in a wireless network.

Certain aspects of the present disclosure provide a method for wireless communications by a user equipment (UE). The method generally includes determining one or more narrowband regions partitioned from wider system bandwidth for communicating with a base station, determining resources, within the one or more narrowband regions of a first subframe, for transmission of sounding reference signals (SRS) by the UE, deciding whether or not to transmit SRS on the determined resources of the first subframe, and transmitting or not transmitting the SRS on the determined resources of the first subframe based on the decision.

Certain aspects of the present disclosure provide an apparatus for wireless communications by a user equipment (UE). The apparatus generally includes means for determining one or more narrowband regions partitioned from wider system bandwidth for communicating with a base station, means for determining resources, within the one or more narrowband regions of a first subframe, for transmission of sounding reference signals (SRS) by the UE, and means for deciding whether or not to transmit SRS on the determined resources of the first subframe, and means for transmitting or not transmitting the SRS on the determined resources of the first subframe based on the decision.

Certain aspects of the present disclosure provide an apparatus for wireless communications by a user equipment (UE). The apparatus generally includes at least one processor configured to determine one or more narrowband regions partitioned from wider system bandwidth for communicating with a base station, determine resources, within the one or more narrowband regions of a first subframe, for transmission of sounding reference signals (SRS) by the UE, decide whether or not to transmit SRS on the determined resources of the first subframe, and transmit or not transmit the SRS on the determined resources of the first subframe based on the decision. The apparatus also generally includes a memory coupled with the at least one processor.

Certain aspects of the present disclosure provide a non-transitory computer readable medium comprising code for: determining one or more narrowband regions partitioned from wider system bandwidth for communicating with a base station, determining resources, within the one or more narrowband regions of a first subframe, for transmission of sounding reference signals (SRS) by the UE, deciding whether or not to transmit SRS on the determined resources of the first subframe, and transmit or not transmit the SRS on the determined resources of the first subframe based on the decision.

Numerous other aspects are provided including methods, apparatus, systems, computer program products, computer-readable medium, and processing systems, for example, for performing techniques disclosed herein.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

DETAILED DESCRIPTION

Aspects of the present disclosure provide techniques and apparatus for supporting SRS transmissions by devices with limited communication resources, such as low cost (LC) machine type communication (MTC) devices, LC enhanced MTC (eMTC) devices, etc.

The techniques described herein may be used for various wireless communication networks such as Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, etc. The terms "network" and "system" are often used interchangeably. A CDMA network may implement a radio technology such as Universal Terrestrial Radio Access (UTRA), cdma2000, etc. UTRA includes Wideband-CDMA (W-CDMA), Time Division Synchronous CDMA (TD-SCDMA), and other variants of CDMA. cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) and LTE-Advanced (LTE-A), in both frequency division duplex (FDD) and time division duplex (TDD), are new releases of UMTS that use E-UTRA, which employs OFDMA on the downlink and SC-FDMA on the uplink.

UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, certain aspects of the techniques are described below for LTE/LTE-A, and LTE/LTE-A terminology is used in much of the description below. LTE and LTE-A are referred to generally as LTE.

Figure 1:
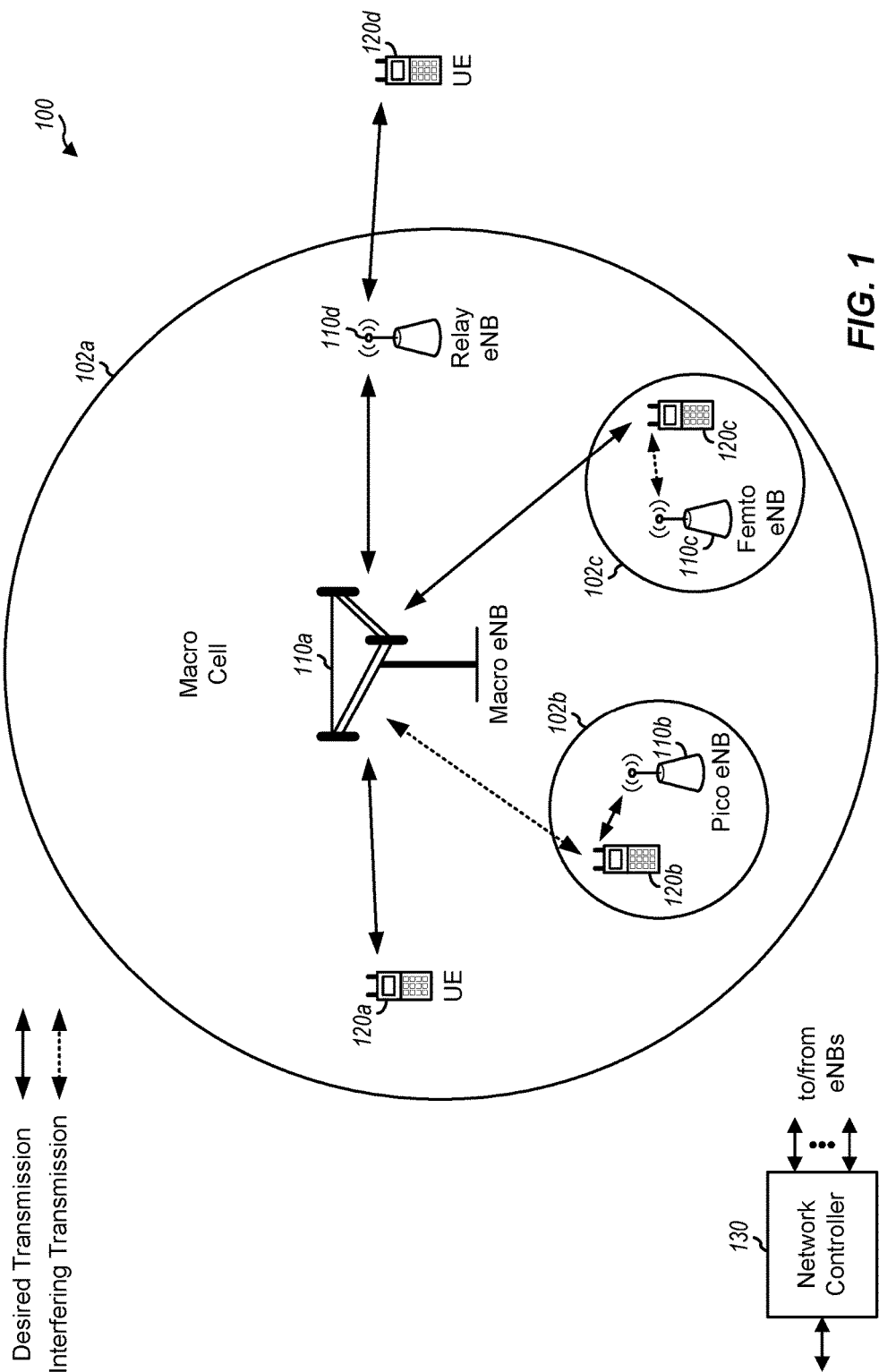
FIG. 1 is a block diagram conceptually illustrating an example wireless communication network, in accordance with certain aspects of the present disclosure.

FIG. 1 illustrates an example wireless communication network 100 with base stations (BSs) and user equipments (UEs), in which aspects of the present disclosure may be practiced.

For example, one or more paging procedure enhancements for certain UEs (e.g., LC MTC UEs, LC eMTC UEs, etc.) in the wireless communication network 100 may be supported. According to the techniques presented herein, the BSs and LC UE(s) in the wireless communication network 100 may be able to determine, from the available system bandwidth supported by the wireless communication network 100, which narrowband region(s) the LC UE(s) should monitor for a bundled paging message transmitted from the BSs in the wireless communication network 100. Also, according to techniques presented herein, the BSs and/or LC UE(s) in the wireless communication network 100 may be able to determine and/or adapt the bundling size for the paging message based on one or more triggers in the wireless communication network 100.

The wireless communication network 100 may be an LTE network or some other wireless network. Wireless communication network 100 may include a number of evolved Node Bs (eNBs) 110 and other network entities. An eNB is an entity that communicates with user equipments (UEs) and may also be referred to as a base station, a Node B, an access point (AP), etc. Each eNB may provide communication coverage for a particular geographic area. In 3GPP, the term "cell" can refer to a coverage area of an eNB and/or an eNB subsystem serving this coverage area, depending on the context in which the term is used.

An eNB may provide communication coverage for a macro cell, a pico cell, a femto cell, and/or other types of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). An eNB for a macro cell may be referred to as a macro eNB. An eNB for a pico cell may be referred to as a pico eNB. An eNB for a femto cell may be referred to as a femto eNB or a home eNB (HeNB). In the example shown in FIG. 1, an eNB 110a may be a macro eNB for a macro cell 102a, an eNB 110b may be a pico eNB for a pico cell 102b, and an eNB 110c may be a femto eNB for a femto cell 102c. An eNB may support one or multiple (e.g., three) cells. The terms "eNB", "base station," and "cell" may be used interchangeably herein.

Wireless communication network 100 may also include relay stations. A relay station is an entity that can receive a transmission of data from an upstream station (e.g., an eNB or a UE) and send a transmission of the data to a downstream station (e.g., a UE or an eNB). A relay station may also be a UE that can relay transmissions for other UEs. In the example shown in FIG. 1, a relay (station) eNB 110d may communicate with macro eNB 110a and a UE 120d in order to facilitate communication between eNB 110a and UE 120d. A relay station may also be referred to as a relay eNB, a relay base station, a relay, etc.

Wireless communication network 100 may be a heterogeneous network that includes eNBs of different types, e.g., macro eNBs, pico eNBs, femto eNBs, relay eNBs, etc. These different types of eNBs may have different transmit power levels, different coverage areas, and different impact on interference in wireless communication network 100. For example, macro eNBs may have a high transmit power level (e.g., 5 to 40 W) whereas pico eNBs, femto eNBs, and relay eNBs may have lower transmit power levels (e.g., 0.1 to 2 W).

A network controller 130 may couple to a set of eNBs and may provide coordination and control for these eNBs. Network controller 130 may communicate with the eNBs via a backhaul. The eNBs may also communicate with one another, e.g., directly or indirectly via a wireless or wireline backhaul.

UEs 120 (e.g., 120a, 120b, 120c) may be dispersed throughout wireless communication network 100, and each UE may be stationary or mobile. A UE may also be referred to as an access terminal, a terminal, a mobile station (MS), a subscriber unit, a station (STA), etc. Some examples of UEs may include cellular phones, smart phones, personal digital assistants (PDAs), wireless modems, a wireless communication device, handheld devices, navigation devices, gaming devices, cameras, tablets, laptop computers, netbooks, smartbooks, ultrabooks, cordless phones, wireless local loop (WLL) stations, wearable devices (e.g., smart glasses, smart goggles, smart watches, smart wristbands, smart bracelets, smart rings, smart jewelry, smart hats, smart clothing), etc. Some UEs may be considered machine-type communication (MTC) UEs, which may include remote devices, such as sensors, meters, monitors, location tags, drones, trackers, robots, etc., that may communicate with a base station, another remote device, or some other entity. To enhance coverage of certain devices, such as MTC devices, "bundling" may be utilized in which certain transmissions are sent as a bundle of transmissions, for example, with the same information transmitted over multiple subframes. MTC devices, as well as other types of devices, may include internet of everything (IoE) or internet-of-things (IoT) devices, such as NB-IoT (narrowband internet-of-things) devices, and techniques disclosed herein may be applied to MTC devices, NB-IoT devices, as well as other devices.

One or more UEs 120 in the wireless communication network 100 (e.g., an LTE network) may also be low cost (LC), low data rate devices, e.g., such as LC MTC UEs, LC eMTC UEs, etc. The LC UEs may co-exist with legacy and/or advanced UEs in the LTE network and may have one or more capabilities that are limited when compared to the other UEs (e.g., non-LC UEs) in the wireless network. For example, when compared to legacy and/or advanced UEs in the LTE network, the LC UEs may operate with one or more of the following: a reduction in maximum bandwidth (relative to legacy UEs), a single receive radio frequency (RF) chain, reduction of peak rate, reduction of transmit power, rank 1 transmission, half duplex operation, etc. As used herein, devices with limited communication resources, such as MTC devices, eMTC devices, etc. are referred to generally as LC UEs. Similarly, legacy devices, such as legacy and/or advanced UEs (e.g., in LTE) are referred to generally as non-LC UEs.

Figure 2:
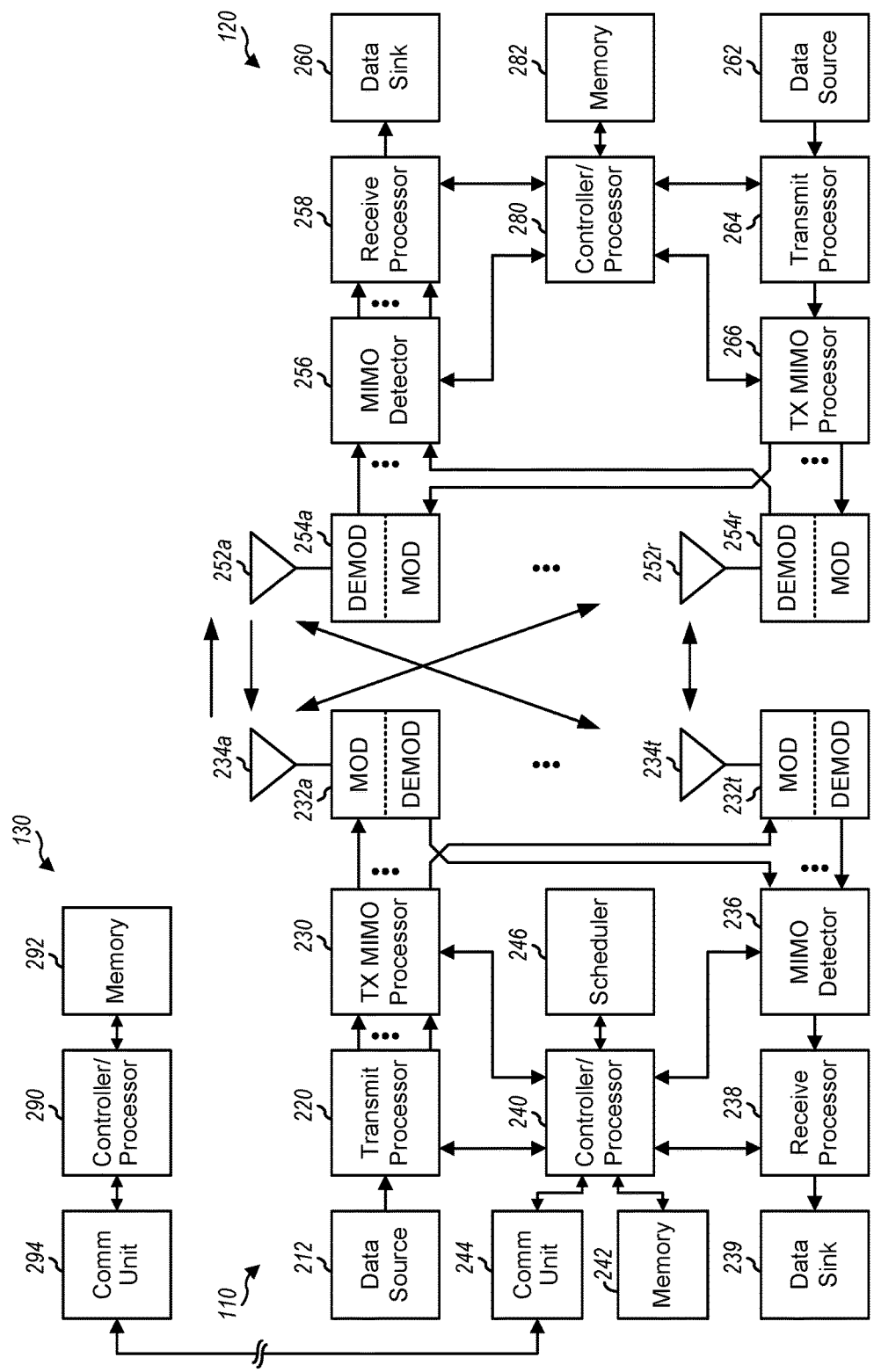
FIG. 2 is a block diagram conceptually illustrating an example of an evolved nodeB (eNB) in communication with a user equipment (UE) in a wireless communications network, in accordance with certain aspects of the present disclosure.

FIG. 2 is a block diagram of a design of eNB 110 and UE 120, which may be one of the eNBs 110 and one of the UEs 120, respectively, in FIG. 1. eNB 110 may be equipped with T antennas 234a through 234t, and UE 120 may be equipped with R antennas 252a through 252r, where in general T≥1 and R≥1.

At eNB 110, a transmit processor 220 may receive data from a data source 212 for one or more UEs, select one or more modulation and coding schemes (MCSs) for each UE based on channel quality indicators (CQIs) received from the UE, process (e.g., encode and modulate) the data for each UE based on the MCS(s) selected for the UE, and provide data symbols for all UEs. Transmit processor 220 may also process system information (e.g., for semi-static resource partitioning information (SRPI), etc.) and control information (e.g., CQI requests, grants, upper layer signaling, etc.) and provide overhead symbols and control symbols. Processor 220 may also generate reference symbols for reference signals (e.g., the common reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each MOD 232 may process a respective output symbol stream (e.g., for OFDM, etc.) to obtain an output sample stream. Each MOD 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from eNB 110 and/or other BSs and may provide received signals to demodulators (DEMODs) 254a through 254r, respectively. Each DEMOD 254 may condition (e.g., filter, amplify, downconvert, and digitize) its received signal to obtain input samples. Each DEMOD 254 may further process the input samples (e.g., for OFDM, etc.) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), CQI, etc.

On the uplink, at UE 120, a transmit processor 264 may receive and process data from a data source 262 and control information (e.g., for reports comprising RSRP, RSSI, RSRQ, CQI, etc.) from controller/processor 280. Processor 264 may also generate reference symbols for one or more reference signals. The symbols from transmit processor 264 may be precoded by a TX MIMO processor 266 if applicable, further processed by MODs 254a through 254r (e.g., for SC-FDM, OFDM, etc.), and transmitted to eNB 110. At eNB 110, the uplink signals from UE 120 and other UEs may be received by antennas 234, processed by DEMODs 232, detected by a MIMO detector 236 if applicable, and further processed by a receive processor 238 to obtain decoded data and control information sent by UE 120. Processor 238 may provide the decoded data to a data sink 239 and the decoded control information to controller/processor 240. eNB 110 may include communication unit 244 and communicate to network controller 130 via communication unit 244. Network controller 130 may include communication unit 294, controller/processor 290, and memory 292.

Controllers/processors 240 and 280 may direct the operation at eNB 110 and UE 120, respectively. For example, controller/processor 240 and/or other processors and modules at eNB 110 may perform or direct operations and/or processes for techniques described herein. Similarly, controller/processor 280 and/or other processors and modules at UE 120 may perform or direct operations and/or processes for the techniques described herein (e.g., those illustrated in FIG. 6). Memories 242 and 282 may store data and program codes for eNB 110 and UE 120, respectively. A scheduler 246 may schedule UEs for data transmission on the downlink and/or uplink.

Figure 3:
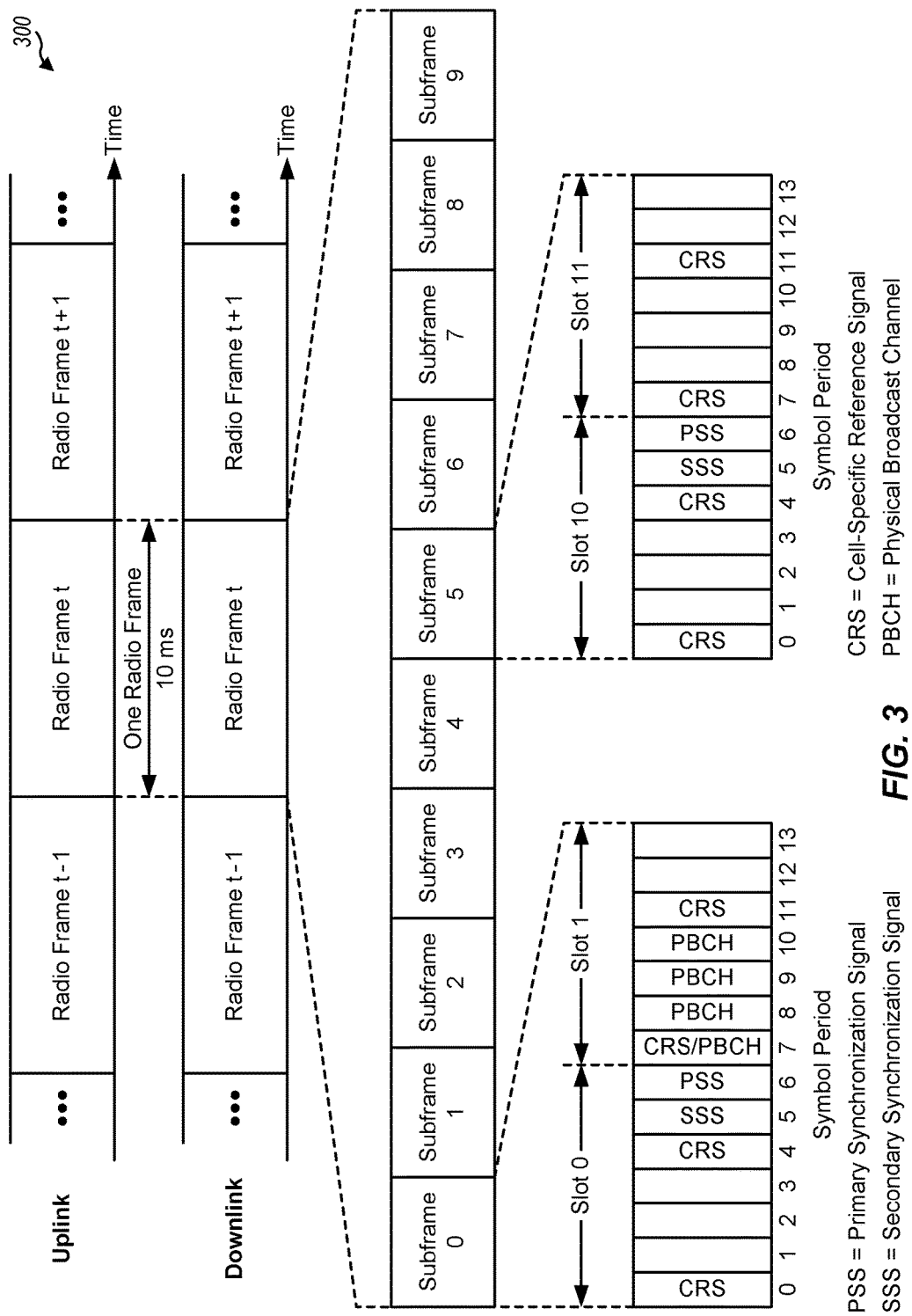
FIG. 3 is a block diagram conceptually illustrating an example frame structure for a particular radio access technology (RAT) for use in a wireless communications network, in accordance with certain aspects of the present disclosure.

FIG. 3 shows an exemplary frame structure 300 for FDD in LTE. The transmission timeline for each of the downlink and uplink may be partitioned into units of radio frames. Each radio frame may have a predetermined duration (e.g., 10 milliseconds (ms)) and may be partitioned into 10 subframes with indices of 0 through 9. Each subframe may include two slots. Each radio frame may thus include 20 slots with indices of 0 through 19. Each slot may include L symbol periods, e.g., seven symbol periods for a normal cyclic prefix (as shown in FIG. 2) or six symbol periods for an extended cyclic prefix. The 2L symbol periods in each subframe may be assigned indices of 0 through 2L−1.

In LTE, an eNB may transmit a primary synchronization signal (PSS) and a secondary synchronization signal (SSS) on the downlink in the center 1.08 MHz of the system bandwidth for each cell supported by the eNB. The PSS and SSS may be transmitted in symbol periods 6 and 5, respectively, in subframes 0 and 5 of each radio frame with the normal cyclic prefix, as shown in FIG. 3. The PSS and SSS may be used by UEs for cell search and acquisition. The eNB may transmit a cell-specific reference signal (CRS) across the system bandwidth for each cell supported by the eNB. The CRS may be transmitted in certain symbol periods of each subframe and may be used by the UEs to perform channel estimation, channel quality measurement, and/or other functions. The eNB may also transmit a physical broadcast channel (PBCH) in symbol periods 0 to 3 in slot 1 of certain radio frames. The PBCH may carry some system information. The eNB may transmit other system information such as system information blocks (SIBs) on a physical downlink shared channel (PDSCH) in certain subframes. The eNB may transmit control information/data on a physical downlink control channel (PDCCH) in the first B symbol periods of a subframe, where B may be configurable for each subframe. The eNB may transmit traffic data and/or other data on the PDSCH in the remaining symbol periods of each subframe.

The PSS, SSS, CRS, and PBCH in LTE are described in 3GPP TS 36.211, entitled "Evolved Universal Terrestrial Radio Access (E-UTRA); Physical Channels and Modulation," which is publicly available.

Figure 4:
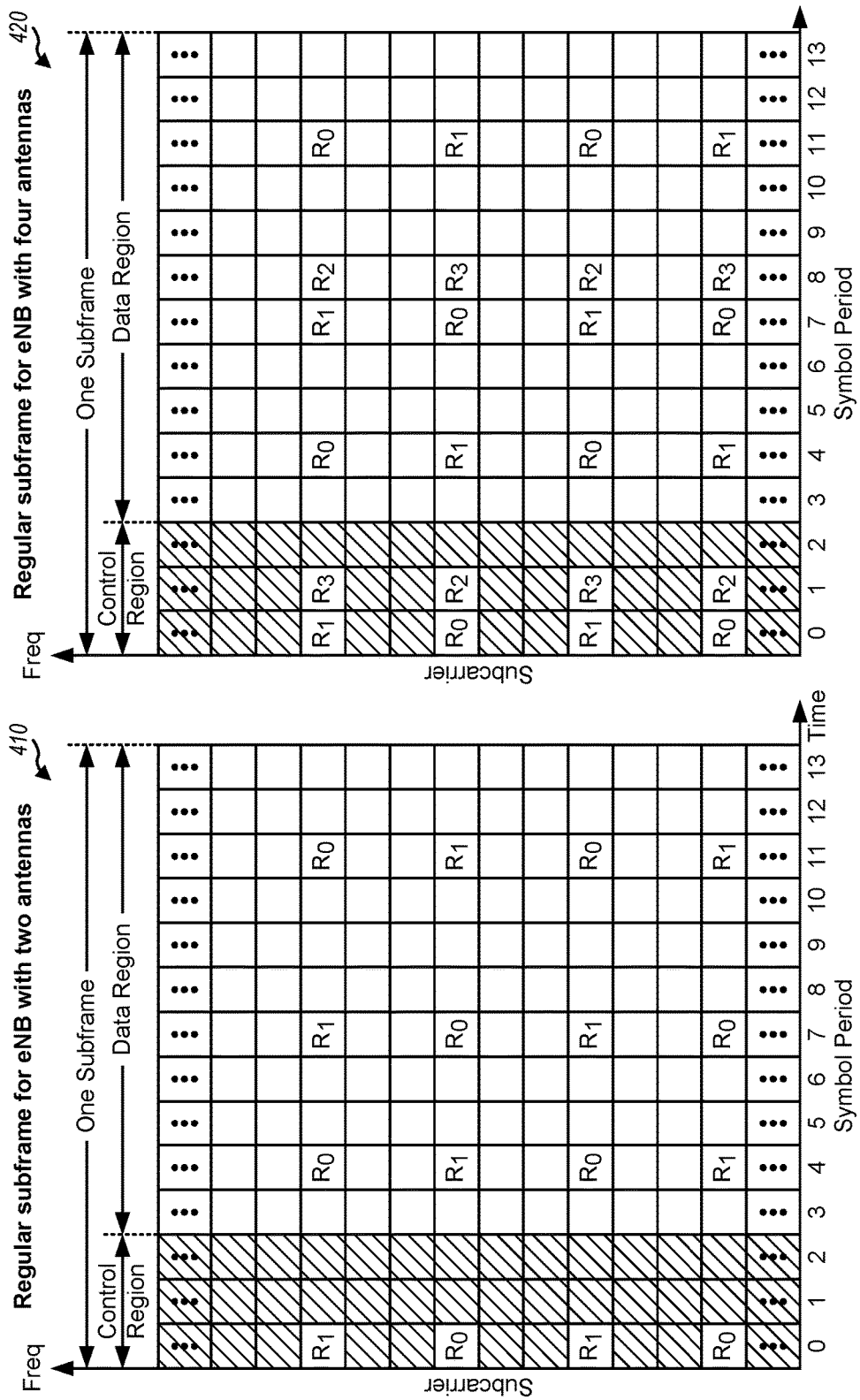
FIG. 4 illustrates example subframe formats for the downlink with a normal cyclic prefix, in accordance with certain aspects of the present disclosure.

FIG. 4 shows two example subframe formats 410 and 420 for the downlink with a normal cyclic prefix. The available time frequency resources for the downlink may be partitioned into resource blocks. Each resource block may cover 12 subcarriers in one slot and may include a number of resource elements. Each resource element may cover one subcarrier in one symbol period and may be used to send one modulation symbol, which may be a real or complex value.

Subframe format 410 may be used for an eNB equipped with two antennas. A CRS may be transmitted from antennas 0 and 1 in symbol periods 0, 4, 7, and 11. A reference signal is a signal that is known a priori by a transmitter and a receiver and may also be referred to as pilot. A CRS is a reference signal that is specific for a cell, e.g., generated based on a cell identity (ID). In FIG. 4, for a given resource element with label Ra, a modulation symbol may be transmitted on that resource element from antenna a, and no modulation symbols may be transmitted on that resource element from other antennas. Subframe format 420 may be used for an eNB equipped with four antennas. A CRS may be transmitted from antennas 0 and 1 in symbol periods 0, 4, 7, and 11 and from antennas 2 and 3 in symbol periods 1 and 8. For both subframe formats 410 and 420, a CRS may be transmitted on evenly spaced subcarriers, which may be determined based on cell ID. Different eNBs may transmit their CRSs on the same or different subcarriers, depending on their cell IDs. For both subframe formats 410 and 420, resource elements not used for the CRS may be used to transmit data (e.g., traffic data, control data, and/or other data).

An interlace structure may be used for each of the downlink and uplink for FDD in LTE. For example, Q interlaces with indices of 0 through Q−1 may be defined, where Q may be equal to 4, 6, 8, 10, or some other value. Each interlace may include subframes that are spaced apart by Q frames. In particular, interlace q may include subframes q, q+Q, q+2Q, etc., where q∈{0, . . . , Q−1}.

The wireless network may support hybrid automatic retransmission request (HARQ) for data transmission on the downlink and uplink. For HARQ, a transmitter (e.g., an eNB 110) may send one or more transmissions of a packet until the packet is decoded correctly by a receiver (e.g., a UE 120) or some other termination condition is encountered. For synchronous HARQ, all transmissions of the packet may be sent in subframes of a single interlace. For asynchronous HARQ, each transmission of the packet may be sent in any subframe.

A UE may be located within the coverage of multiple eNBs. One of these eNBs may be selected to serve the UE. The serving eNB may be selected based on various criteria such as received signal strength, received signal quality, path loss, etc. Received signal quality may be quantified by a signal-to-interference-plus-noise ratio (SINR), or a reference signal received quality (RSRQ), or some other metric. The UE may operate in a dominant interference scenario in which the UE may observe high interference from one or more interfering eNBs.

As mentioned above, one or more UEs in the wireless communication network (e.g., wireless communication network 100) may be devices that have limited communication resources, such as LC UEs, as compared to other (non-LC) devices in the wireless communication network.

In some systems, for example, in LTE Rel-13, the LC UE may be limited to a particular narrowband assignment (e.g., of no more than six resource blocks (RBs)) within the available system bandwidth. However, the LC UE may be able to re-tune (e.g., operate and/or camp) to different narrowband regions within the available system bandwidth of the LTE system, for example, in order to co-exist within the LTE system.

As another example of coexistence within the LTE system, LC UEs may be able to receive (with repetition) legacy physical broadcast channel (PBCH) (e.g., the LTE physical channel that, in general, carries parameters that may be used for initial access to the cell) and support one or more legacy physical random access channel (PRACH) formats. For example, the LC UE may be able to receive the legacy PBCH with one or more additional repetitions of the PBCH across multiple subframes. As another example, the LC UE may be able to transmit one or more repetitions of PRACH (e.g., with one or more PRACH formats supported) to an eNB in the LTE system. The PRACH may be used to identify the LC UE. Also, the number of repeated PRACH attempts may be configured by the eNB.

The LC UE may also be a link budget limited device and may operate in different modes of operation (e.g. entailing different amounts of repeated messages transmitted to or from the LC UE) based on its link budget limitation. For example, in some cases, the LC UE may operate in a normal coverage mode in which there is little to no repetition (e.g., the amount of repetition needed for the UE to successfully receive and/or transmit a message may be low or repetition may not even be needed). Alternatively, in some cases, the LC UE may operate in a coverage enhancement (CE) mode in which there may be high amounts of repetition. For example, for a 328 bit payload, a LC UE in CE mode may need 150 or more repetitions of the payload in order to successfully receive the payload.

In some cases, e.g., also for LTE Rel-13, the LC UE may have limited capabilities with respect to its reception of broadcast and unicast transmissions. For example, the maximum transport block (TB) size for a broadcast transmission received by the LC UE may be limited to 1000 bits. Additionally, in some cases, the LC UE may not be able to receive more than one unicast TB in a subframe. In some cases (e.g., for both the CE mode and normal mode described above), the LC UE may not be able to receive more than one broadcast TB in a subframe. Further, in some cases, the LC UE may not be able to receive both a unicast TB and a broadcast TB in a subframe.

For MTC, LC UEs that co-exist in the LTE system may also support new messages for certain procedures, such as paging, random access procedure, etc. (e.g., as opposed to conventional messages used in LTE for these procedures). In other words, these new messages for paging, random access procedure, etc. may be separate from the messages used for similar procedures associated with non-LC UEs. For example, as compared to conventional paging messages used in LTE, LC UEs may be able to monitor and/or receive paging messages that non-LC UEs may not be able to monitor and/or receive. Similarly, as compared to conventional random access response (RAR) messages used in a conventional random access procedure, LC UEs may be able to receive RAR messages that also may not be able to be received by non-LC UEs. The new paging and RAR messages associated with LC UEs may also be repeated one or more times (e.g., "bundled"). In addition, different numbers of repetitions (e.g., different bundling sizes) for the new messages may be supported.

Figure 5A:
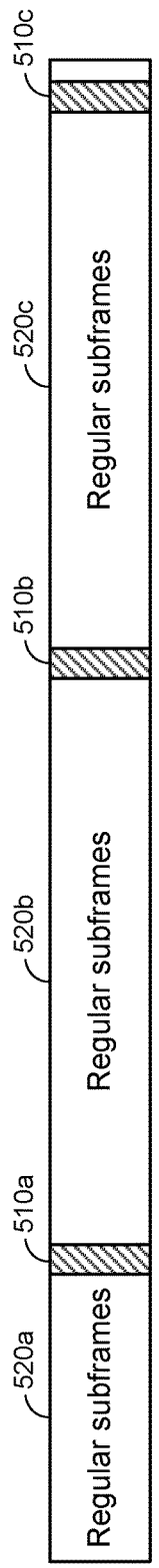
FIGS. 5A and 5B illustrate an example of MTC coexistence within a wideband system, such as LTE, in accordance with certain aspects of the present disclosure.
Figure 5A:
Figure 5B:
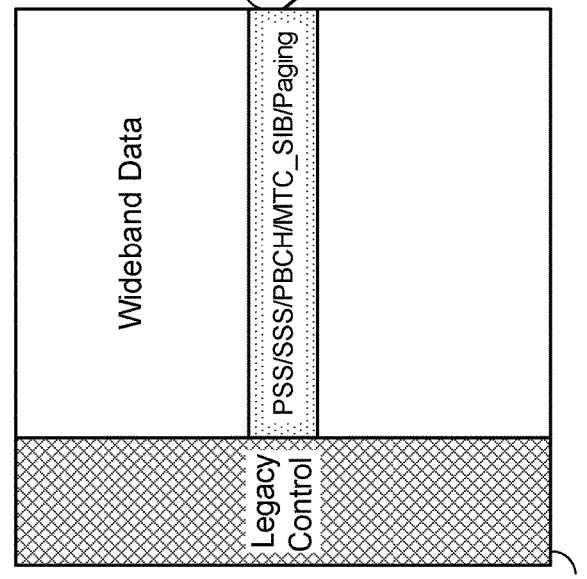

As mentioned above, MTC and/or eMTC operation may be supported in the wireless communication network (e.g., in coexistence with LTE or some other RAT). FIGS. 5A and 5B, for example, illustrate an example of how LC UEs in MTC operation may co-exist within a wideband system (e.g., 1.4/3/5/10/15/20 MHz), such as LTE.

As illustrated in the example frame structure of FIG. 5A, subframes 510 associated with MTC and/or eMTC operation may be time division multiplexed (TDM) with regular subframes 520 associated with LTE (or some other RAT).

Additionally or alternatively, as illustrated in the example frame structure of FIG. 5B, one or more narrowband regions 560, 562 used by LC UEs in MTC may be frequency division multiplexed within the wider bandwidth 550 supported by LTE. Multiple narrowband regions, with each narrowband region spanning a bandwidth that is no greater than a total of 6 RBs, may be supported for MTC and/or eMTC operation. In some cases, each LC UE in MTC operation may operate within one narrowband region (e.g., at 1.4 MHz or 6 RBs) at a time. However, LC UEs in MTC operation, at any given time, may re-tune to other narrowband regions in the wider system bandwidth. In some examples, multiple LC UEs may be served by the same narrowband region. In other examples, multiple LC UEs may be served by different narrowband regions (e.g., with each narrowband region spanning 6 RBs). In yet other examples, different combinations of LC UEs may be served by one or more same narrowband regions and/or one or more different narrowband regions.

The LC UEs may operate (e.g., monitor/receive/transmit) within the narrowband regions for various different operations. For example, as shown in FIG. 5B, a first narrowband region 560 (e.g., spanning no more than 6 RBs of the wideband data) of a subframe 552 may be monitored by one or more LC UEs for either a PSS, SSS, PBCH, MTC signaling, or paging transmission from a BS in the wireless communication network. As also shown in FIG. 5B, a second narrowband region 562 (e.g., also spanning no more than 6 RBs of the wideband data) of a subframe 554 may be used by LC UEs to transmit a RACH or data previously configured in signaling received from a BS. In some cases, the second narrowband region may be utilized by the same LC UEs that utilized the first narrowband region (e.g., the LC UEs may have re-tuned to the second narrowband region to transmit after monitoring in the first narrowband region). In some cases (although not shown), the second narrowband region may be utilized by different LC UEs than the LC UEs that utilized the first narrowband region.

In certain systems, eMTC UEs may support narrowband operation while operating in a wider system bandwidth. For example, an eMTC UE may transmit and receive in a narrowband region of a system bandwidth. As noted above, the narrowband region may span 6 resource blocks (RBs).

Certain systems may provide MTC UEs with coverage enhancements of up to 15 dB, which maps to 155.7 dB maximum coupling loss between the UE and an eNB. Accordingly, eMTC UEs and eNB may perform measurements at low SNRs (e.g., −15 dB to −20 dB). In some systems, coverage enhancements may include channel bundling, wherein messages associated with eMTC UEs may be repeated (e.g., bundled) one or more times.

Although the examples described herein assume a narrowband of 6 RBs, those skilled in the art will recognize that the techniques presented herein may also be applied to different sizes of narrowband regions (e.g., narrowband IoT).

A sounding reference signal (SRS) is a signal that a user equipment (UE) transmits to an eNB on the uplink so that the eNB may calculate, among other things, uplink pathloss, timing, and estimate the channel. In some cases, SRS transmission may be performed during the last symbol of a particular uplink subframe. For example, during an uplink subframe, a UE may transmit a physical uplink shared channel (PUSCH) for the majority of the uplink subframe and may drop transmission of the PUSCH during the last symbol of this subframe and instead transmit an SRS.

In LTE, SRS may be transmitted in two different ways: periodic and aperiodic. For periodic SRS, a UE may be scheduled to transmit an SRS every certain amount of milliseconds (e.g., 20 ms) in a particular bandwidth. For aperiodic SRS, the eNB may transmit an aperiodic SRS configuration to the UE. Then, the eNB may indicate within a downlink or uplink grant whether the UE is supposed to transmit an SRS is the next N+4 subframe, for example, according to the SRS configuration.

A cell supporting narrowband operations for machine type communication (MTC) may support transmission of sounding reference signals (SRS). The current minimum defined bandwidth for transmission of SRS is four RBs. However, as mentioned above, the bandwidth of narrowband regions is six RBs. The fact that six RBs are not divisible by four RBs presents challenges in managing SRS transmissions using four RBs in six-RB based narrowband operations.

Certain issues may exist, however, when trying to support SRS for MTC devices. For example, MTC UEs may only be capable of half-duplex communication and may only operate using a narrowband of bandwidth. This means that a UE may not be able to transmit PUSCH in one narrowband and SRS in a different narrowband. For example, if a UE is configured to transmit an SRS in narrowband (NB) 1 and the UE also receives an assignment (e.g., assigning a PUSCH transmission) in NB2, the UE is not able to transmit both the SRS and the PUSCH at the same time because the UE would need to retune between transmission and would not have enough time to perform both transmissions.

Additionally, in some cases, a UE may have to use the symbol dedicated for SRS for retuning. For example, in some cases, a UE may be scheduled to transmit a PUSCH in subframe n in a first narrowband and may also be scheduled to transmit another PUSCH in subframe n+1 in a second narrowband. In this case, the UE may have to skip the last symbol of subframe n and the first symbol of subframe n+1 to be able to retune from the first narrowband to the second narrowband. In this case, the UE is unable to transmit an SRS in subframe n since the UE needs time to retune from the first narrowband to the second narrowband.

Additionally, if a UE receives an uplink (UL) grant, the PUSCH may be bundled. For example, a UE may receive a PUSCH assignment for a number of subframes and a trigger for SRS within an UL grant. In this case, the UE may not know where/when to transmit an SRS. That is, the UE may not know how to pick the subframe in which to transmit the SRS.

Additionally, if a UE receives a downlink (DL) grant, the physical downlink shared channel (PDSCH) may be bundled. In this case, the UE may receive the PDSCH and also transmit an SRS in the same subframe. For example, a UE may receive a DL grant in subframe n, where SRS is to be transmitted in subframe n+4. However, since the PDSCH has a bundling size of 8 (the PDSCH is transmitted from subframe n to n+8), the PDSCH may collide with the SRS in subframe n+4.

Accordingly, aspects of the present disclosure provide techniques for assigning transmission resources for transmission of SRS by eMTC UEs in a cell supporting narrowband operations (e.g., for MTC) while also remaining backward compatible to non-eMTC UEs.

Figure 6:
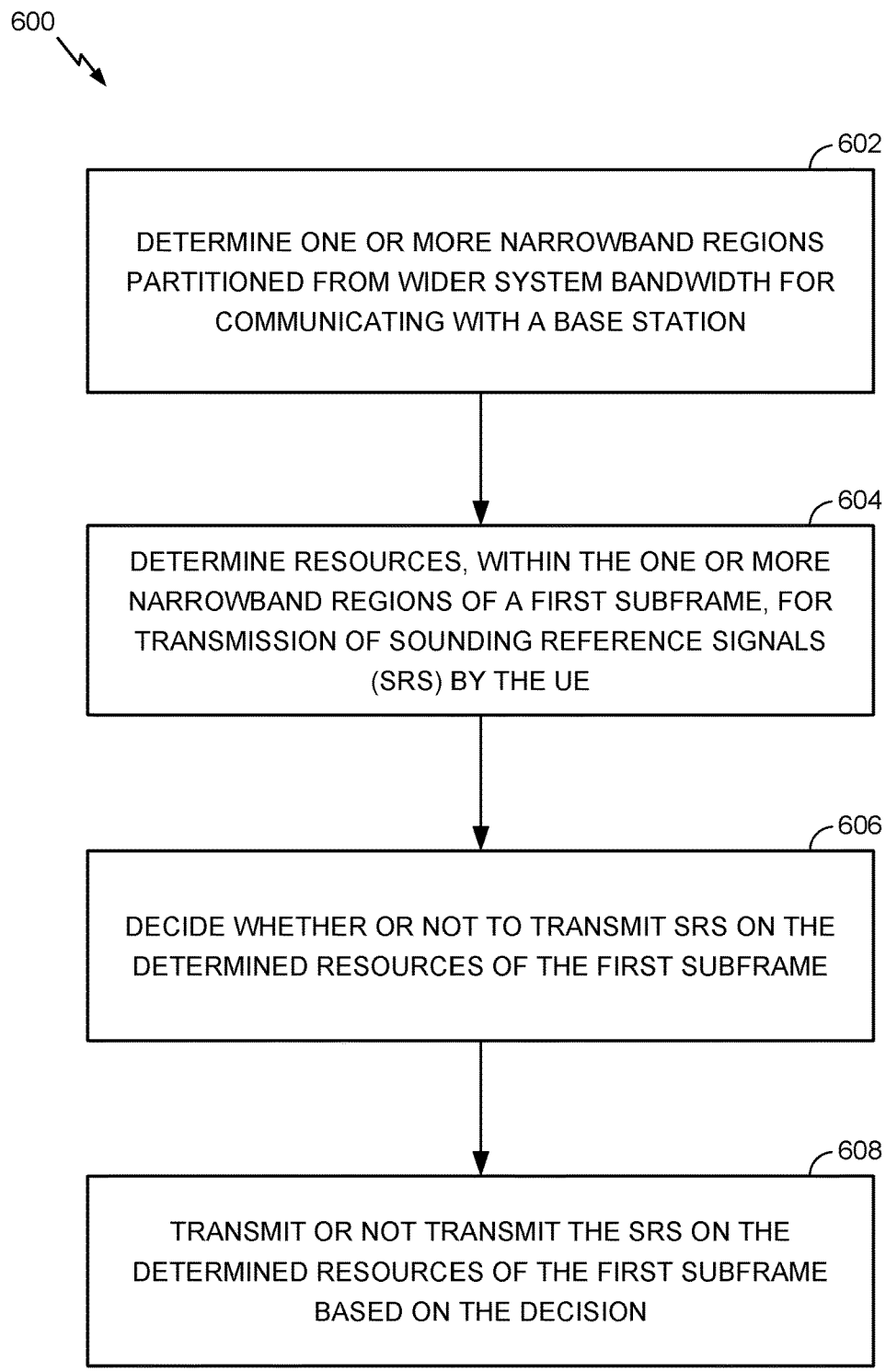
FIG. 6 illustrates an exemplary operation for wireless communications that may be performed by a user equipment (UE), in accordance with certain aspects of the present disclosure.

FIG. 6 illustrates example operations 600 for wireless communications, according to certain aspects of the present disclosure. According to certain aspects, example operations 600 may be performed by a user equipment (UE) (e.g., an MTC UE, such as one or more of the UEs 120) and may enable support of sounding reference signals (SRSs) for machine type communications.

The operations 600 begin at 602 by determining one or more narrowband regions partitioned from wider system bandwidth for communicating with a base station. At 604, the UE determines resources, within the one or more narrowband regions of a first subframe, for transmission of sounding reference signals (SRS) by the UE. At 606, the UE decides whether or not to transmit SRS on the determined resources of the first subframe. At 608, the UE transmits (or does not transmit) the SRS on the determined resources of the first subframe based on the decision.

As noted above, for eMTC devices (e.g., eMTC UEs), there may be an issue with SRS transmission and retuning between narrowbands. For example, in some cases, a UE may need to use the symbol designated for SRS transmission to retune to a different narrowband.

According to certain aspects, to help address this SRS/retuning issue, SRS transmission may be determined based on a previous narrowband and on a next narrowband. That is, SRS transmission may take into account the fact that a UE may need to retune to a different narrowband. According to certain aspects, there may be different options for taking into account SRS and retuning.

For example, in one option, if a UE is scheduled to tune from one UL narrowband to another UL narrowband, the UE may drop its transmission of SRS (e.g., not transmit an SRS) since the UE may only have two symbols to retune (e.g., the UE needs to use the symbol designated for SRS to retune).

Another option may take into account whether the UE is scheduled to tune from UL to DL and may also be dependent on an operating mode of the UE (e.g., frequency division duplexing (FDD)/time division duplexing (TDD)). For example, for FDD, a UE may need a large amount of time to be able to retune from UL to DL since the UL narrowband and the DL narrowband are far apart from each other. In this case (e.g., for an FDD UE retuning from UL to DL), the UE may transmit an SRS during the last symbol of its UL subframe and may use the next whole subframe to retune to DL. However, for TDD, since the UE only has two symbols to retune, the UE may drop transmission of the SRS. Additionally, for TDD, if the UE is scheduled to transmit SRS in a partial downlink subframe, the decision of whether to transmit the SRS or not may be dependent on the duration of the partial downlink subframe, partial uplink subframe, and/or a guard period.

Overall, according to certain aspects, for SRS/retuning, a UE may determine if SRS is transmitted in first subframe based at least on frequency location/direction (e.g., UL/DL) of first subframe and frequency location/direction of second subframe. Additionally, for TDD, this determination may also be based on the duration of partial downlink subframe and/or partial uplink subframe.

Another issue with SRS for eMTC is with the frequency location of the narrowband for SRS and the narrowband for PUSCH. For example, current SRS frequency position is semi-statically configured by radio resource control (RRC), but narrowband for PUSCH is dynamically configured. This means that if legacy rules are followed, a UE may not be able to transmit SRS if the PUSCH and SRS narrowbands are different.

Figure 7A:
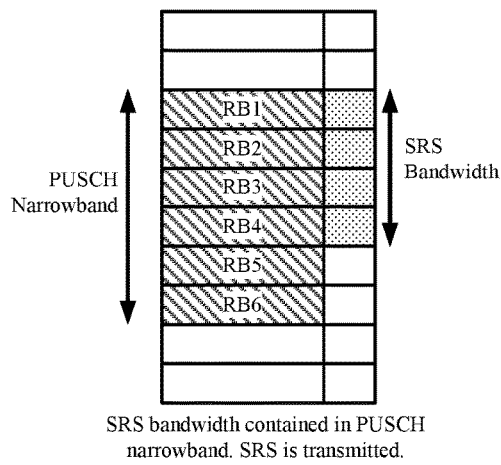
FIGS. 7A-7D illustrate different combinations of PUSCH/SRS resource overlapping, in accordance with certain aspects of the present disclosure.
Figure 7B:
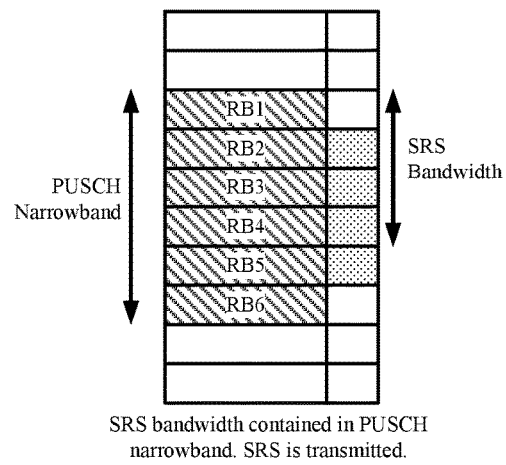
Figure 7C:
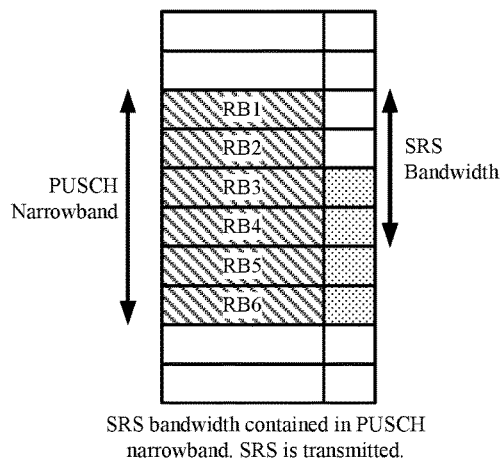
Figure 7D:
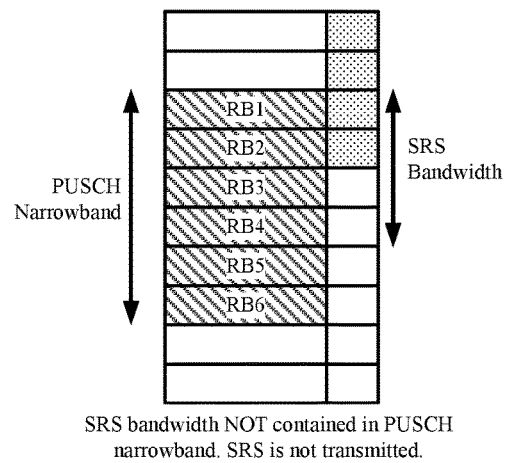

To help address this problem, one option may be to tie the SRS narrowband to the PUSCH narrowband. As noted above, the narrowband size for SRS is 4 resource blocks (RBs) while the narrowband size for PUSCH is 6RBs. Thus, depending on the offset, there may be different possibilities for overlapping of narrowbands of 4RBs and 6RBs, for example, as shown in FIGS. 7A-7C. For example, the four SRS RBs may overlap RB1-RB4 (e.g., as shown in FIG. 7A), RB2-RB5 (e.g., as shown in FIG. 7B), or RB3-RB6 (e.g., as shown in FIG. 7C) of the 6 PUSCH RBs. If a set of 4 SRS RBs is able to fully overlap with the 6 PUSCH RBs (e.g., as with one of the combinations illustrated in FIGS. 7A-7C), then a SRS may be transmitted by the UE. If, however, the 4 SRS RBs cannot fit within the 6 PUSCH RBs (e.g., as shown in FIG. 7D), then the UE may decide to drop the SRS or apply one of the solutions below.

Additionally, the UE may receive from a higher layer different SRS configurations (e.g., including information about a narrowband to use for SRS, a cyclic shift, a comb index, etc.) for different narrowbands, and depending on the PUSCH narrowband, the UE may decide to use one SRS configuration over another. That is, the UE may receive higher layer information on how to transmit the SRS in a given narrowband depending on the PUSCH narrowband.

Thus, for example, according to certain aspects, a UE may determine a first narrowband from a first set of narrowbands for transmitting a PUSCH, determine resources for transmitting SRS based on a first narrowband, and may transmit (or not) SRS based on the determined resources for transmitting SRS. According to certain aspects, these determinations are performed based at least on the first narrowband (e.g., PUSCH resources) and a second set of narrowbands (SRS resources). Additionally, the UE may receive layer information for a subset of the narrowbands in the first set of narrowbands and may base the determination of the resources for transmitting SRS on the first narrowband and the upper layer information.

In another option, it may be possible to only define an SRS configuration for a subset of narrowbands, so an SRS trigger may be considered if it is received for that narrowband. For example, if a UE is configured with SRS for narrowband (NB) 1 and the PUSCH assignment is in NB1 then the UE may transmit an SRS; however, if the PUSCH assignment is in, for example, NB3, then the UE may decide not to transmit an SRS since the trigger is not in NB1. Optionally, the UE may receive signaling indicating SRS configurations for more than one narrowband. For example, the UE may receive SRS configurations for NB1 and NB3. So, if PUSCH is in either NB1 or NB3 the UE may transmit an SRS in accordance with the corresponding configuration. Thus, for example, according to certain aspects, a UE may determine a first narrowband and a second narrowband, and may transmit SRS if second narrowband is contained in the first narrowband.

Another issue with SRS for eMTC may arise with SRS and bundling. For example, if assuming that a UE may transmit an SRS only in the configured SRS resources, the UE may not know how/where to transmit the SRS when bundling is enabled. In this case, according to certain aspects, the UE may transmit an SRS in the first subframe for which there is a valid SRS configuration (e.g., which may be determined based on a resource grant), which may potentially be more than 1 SRS configuration. For example, if the UE is configured to transmit an SRS in (or the configured SRS overlaps with) NB1, and the PUSCH assignment starts in NB0 and then hops to NB1, the UE may transmit the SRS in NB1 (e.g., in the first subframe). According to certain aspects, this may also apply when multiple SRS configurations are received.

Thus, for example, according to certain aspects, a UE may determine a first set of narrowbands for which there is a valid SRS configuration (e.g., based on a resource grant), determine a hopping sequence of transmission resources (e.g., time and/or frequency resources), for example, based on the resource grant, and determine transmission parameters according to the first set of narrowbands and the hopping sequence. The UE may then decide to transmit an SRS based, at least in part, on the determined transmission parameters, hopping sequence, and/or first set of narrowbands.

Another consideration for supporting SRS for MTC is when a trigger for transmitting SRS is received in a downlink grant. For example, when a UE receives an SRS trigger in a downlink grant, a UE may decide not to follow higher layer parameters (which may indicate a specific narrowband to transmit SRS). Instead, according to certain aspects, the UE may decide to transmit the SRS in an uplink narrowband based on the downlink narrowband. For example, if there is a same number of narrowbands for uplink and downlink, then if the UE receives an SRS trigger in a downlink grant (e.g., a PDSCH grant) for NB0, the UE may decide to transmit the SRS on the uplink in NB0. In other words, the UE may select the uplink narrowband used for transmitting the SRS based on the downlink PDSCH narrowband. While, this is one example of a mapping between downlink and uplink narrow bands (e.g., transmitting in the same uplink narrowband as the downlink narrowband), other mappings between downlink and uplink narrowbands may be used.

Additionally, a UE may decide to transmit an SRS based on information received by higher layers. For example, a UE may receive, from a base station, signaling indicating a plurality of SRS configurations. Thereafter, the UE may receive a resource grant from the base station that contains an SRS trigger (e.g., a trigger to perform SRS) and an indication of an SRS configuration of the plurality of SRS configurations to use for transmitting the SRS. For example, a resource grant generated by the base station may comprise a trigger bit indicating whether the UE should transmit SRS and a bit indicating which SRS configuration to use for transmitting an SRS. The UE may then decide to transmit an SRS in a specific narrowband based, at least in part, on the trigger and the indication of the SRS configuration.

In some cases, a UE may determine that a downlink transmission (e.g., a PDSCH transmission) will collide with an SRS transmission. For example, a UE may receive a grant from a base station comprising a trigger to perform SRS during a specific subframe. The UE may determine that the SRS transmission may collide with a PDSCH transmission during that subframe. In order to prevent collision, the UE may decide to drop at least one of the SRS transmission, the PDSCH transmission, or the resource grant (e.g., the UE may treat the resource grant as invalid).

According to certain aspects, in some cases, SRS may be bundled over multiple symbols instead of just one symbol. This would provide a significant SNR gain, allowing the eNB to estimate the channel even when a UE is in very low SNR. According to certain aspects, to allow for bundled SRS, SRS may be transmitted in two (or more) symbols and code division multiplexing (CDM) may be used to increase multiplexing capacity. For example, an eNB may configure two UEs, UE1 and UE2, with exactly the same SRS configuration (e.g., same comb index, narrowband, cyclic shift, etc.), but give the two UEs different CDM codes. Thus, in the two SRS symbols, UE1 may transmit exactly the same sequence as UE2, but UE2 will flip the sign of one of the CDM codes. For example, UE may use [1 1] while UE2 may use [−1 1]. The eNB may receive both SRSs and may separate the SRSs by removing the CDM code for each UE.

Thus, for example, according to certain aspects, a UE may receive higher layer information for SRS comprising one or more of a CDM index, a comb index, or a cyclic shift. The UE may then receive a grant from a base station comprising a trigger to perform SRS, determine transmission parameters based, at least in part, on the higher layer information and the trigger, and decide whether or not to transmit an SRS based on the determined transmission parameters. If the UE decides to transmit the SRS, the SRS may be masked with the CDM code indicated in the higher layer signaling. An eNB may receive the SRS transmitted by the UE and may decode the SRS using the CDM index for that UE.

In some cases, the decision of whether or not to transmit the SRS may affect rate matching performed by the UE. For example, in some cases, a physical uplink channel (e.g., PUSCH, PUCCH) is rate matched around the last SC- FDMA symbol if SRS is transmitted in the serving cell. In eMTC, however, SRS may be dropped due to retuning, which may create ambiguity at the eNB side, and reduce the timeline. For example, assume a UE receives a grant for PUSCH in subframe N and prepares the PUSCH payload for subframe N+4 in a first narrowband. The UE needs to transmit SRS in the same subframe (e.g., subframe N+4 in the first narrowband), so it rate matches around the last SC-FDMA symbol. Further assume that in subframe N+1, the UE receives a grant for PUSCH transmission in subframe N+5 in a second narrowband. Due to this, the SRS in subframe N+4 is dropped (e.g., not transmitted), for example, to allow the UE enough time to tune to the second narrowband. As SRS is dropped in subframe N+4, the rate matching for PUSCH in subframe N+4 needs to change (e.g., since rate matching includes last symbol). However, if the UE misses the second PUSCH grant for the PUSCH transmission in subframe N+5, there will be confusion between eNB and UE. Further, the timeline for PUSCH is reduced to 3 subframes (PUSCH transmission in N+4 depends on the grant received in N+1). Thus, aspects of the present disclosure present techniques to help alleviate issues with rate matching when a UE decides to drop an SRS transmission.

For example, one solution that may alleviate issues with rate matching relating to SRS transmission, may be to instruct the UE to perform rate matching regardless of SRS being transmitted or not. For example, with reference to the rate matching example noted above, the UE may be instructed to rate match the PUSCH (or another physical uplink channel) around the last symbol, even when PUSCH is transmitted outside the cell-specific SRS region and SRS is not transmitted at all. In other words, PUSCH may be rate matched around the SC-FDMA symbol reserved for a possible SRS transmission in a UE-specific periodic SRS subframe for Bandwidth-reduced Low-complexity or Coverage Enhanced (BL/CE) UEs in coverage enhancement mode A (CEModeA) (e.g., rate matching based on possible SRS transmission, regardless of actual SRS transmission).

According to certain aspects, another solution may be to base rate matching for PUSCH (or another physical uplink channel) when SRS is dropped on whether the dropping is due to PUSCH in the same subframe or a subsequent subframe. For example, if SRS in subframe N is dropped because of PUSCH/PUCCH in a different narrowband in the same subframe N, then all of subframe N may be used for PUSCH. However, if SRS in subframe N is dropped because of PUSCH/PUCCH in a different narrowband, for example, in subframe N+1, then the UE may rate match PUSCH around last SC-FDMA symbol of subframe N.

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

For example, means for transmitting and/or means for receiving may comprise one or more antennas, such as antenna(s) 234 of the eNB 110 and/or antenna(s) 252 of the user equipment 120. Additionally, means for transmitting may comprise one or more processors (e.g., Transmit Processors 220/264 and/or Receive Processors 238/258) configured to transmit/receive via the one or more antennas. Further, means for determining, means for deciding, means for dropping (e.g., an SRS transmission), and/or means for performing (e.g., rate matching) may comprise one or more processors, such as the Transmit Processor 220, the Receive Processor 238, or the Controller/Processor 240 of the eNB 110 and/or the Transmit Processor 264, the Receive Processor 258, or the Controller/Processor 280 of the user equipment 120.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

As used herein, the term receiver may refer to an RF receiver (e.g., of an RF front end) or an interface (e.g., of a processor) of a UE (e.g., UE 120) or BS (e.g., eNB 110) for receiving structures processed by an RF front end (e.g., via a bus). Similarly, the term transmitter may refer to an RF transmitter of an RF front end or an interface (e.g., of a processor) of a UE (e.g., UE 120) or BS (e.g., eNB 110) for outputting structures to an RF front end for transmission (e.g., via a bus). According to certain aspects, a receiver and transmitter may be configured to perform operations described herein. For example, a receiver may be configured to perform any receiving functions described herein such as receiving signaling to trigger transmission of SRS. Additionally a transmitter may be configured to perform any transmitting functions described herein such as transmitting or not transmitting SRS on determined resources of a subframe.

As used herein, a phrase referring to "at least one of" a list of items refers to any combination of those items, including single members. As an example, "at least one of: a, b, or c" is intended to cover: a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, EPROM memory, EEPROM memory, phase change memory, registers, a hard disk, a removable disk, a CD-ROM and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, or combinations thereof. If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user equipment 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further.

The processor may be responsible for managing the bus and general processing, including the execution of software stored on the machine-readable media. The processor may be implemented with one or more general-purpose and/or special-purpose processors. Examples include microprocessors, microcontrollers, DSP processors, and other circuitry that can execute software. Software shall be construed broadly to mean instructions, data, or any combination thereof, whether referred to as software, firmware, middleware, microcode, hardware description language, or otherwise. Machine-readable media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), phase change memory, registers, magnetic disks, optical disks, hard drives, or any other suitable storage medium, or any combination thereof. The machine-readable media may be embodied in a computer-program product. The computer-program product may comprise packaging materials.

In a hardware implementation, the machine-readable media may be part of the processing system separate from the processor. However, as those skilled in the art will readily appreciate, the machine-readable media, or any portion thereof, may be external to the processing system. By way of example, the machine-readable media may include a transmission line, a carrier wave modulated by data, and/or a computer product separate from the wireless node, all which may be accessed by the processor through the bus interface. Alternatively, or in addition, the machine-readable media, or any portion thereof, may be integrated into the processor, such as the case may be with cache and/or general register files.

The processing system may be configured as a general-purpose processing system with one or more microprocessors providing the processor functionality and external memory providing at least a portion of the machine-readable media, all linked together with other supporting circuitry through an external bus architecture. Alternatively, the processing system may be implemented with an ASIC (Application Specific Integrated Circuit) with the processor, the bus interface, the user interface in the case of an access terminal), supporting circuitry, and at least a portion of the machine-readable media integrated into a single chip, or with one or more FPGAs (Field Programmable Gate Arrays), PLDs (Programmable Logic Devices), controllers, state machines, gated logic, discrete hardware components, or any other suitable circuitry, or any combination of circuits that can perform the various functionality described throughout this disclosure. Those skilled in the art will recognize how best to implement the described functionality for the processing system depending on the particular application and the overall design constraints imposed on the overall system.

The machine-readable media may comprise a number of software modules. The software modules include instructions that, when executed by the processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

If implemented in software, the functions may be stored or transmitted over as one or more instructions or code on a computer-readable medium. Computer-readable media include both computer storage media and communication media including any medium that facilitates transfer of a computer program from one place to another. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For certain aspects, the computer program product may include packaging material.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method for wireless communications by a user equipment (UE), comprising:
   determining one or more narrowband regions partitioned from wider system bandwidth for communicating with a base station;
   determining resources, within the one or more narrowband regions of a first subframe, for transmission of sounding reference signals (SRS) by the UE, wherein the resources are determined based, at least in part, on resources used for transmitting a physical uplink shared channel (PUSCH);
   deciding whether or not to transmit SRS on the determined resources of the first subframe based, at least in part, on whether the UE has to retune from a first narrowband region of the one or more narrowband regions of the first subframe to a second narrowband region of a second subframe, wherein deciding whether or not to transmit the SRS comprises deciding not to transmit the SRS when a direction of the first subframe is different than a direction of the second subframe; and
   transmitting or not transmitting the SRS on the determined resources of the first subframe based on the decision.

2. The method of claim 1, wherein deciding whether or not to transmit the SRS is further based, at least in part, on at least one of a frequency location of the first narrowband region of the first subframe or a frequency location of the second narrowband region of the second subframe.

3. The method of claim 2, wherein deciding whether or not to transmit the SRS comprises deciding not to transmit the SRS if the frequency location of the first narrowband region is different from the frequency location of the second narrowband region.

4. The method of claim 2, wherein deciding whether or not to transmit the SRS is further based, at least in part, on an operating mode of the UE, wherein operating modes comprise at least one of a frequency division duplex (FDD) mode or a time division duplex (TDD) mode.

5. The method of claim 4, wherein, for TDD mode, deciding whether or not to transmit the SRS is further based, at least in part, on at least one of a duration of a partial downlink subframe or a duration of a partial uplink subframe.

6. The method of claim 1, wherein the resources are determined, at least in part, based on upper layer information for a subset of narrowbands, comprising one or more of a cyclic shift or a comb index.

7. The method of claim 1, further comprising receiving signaling to trigger transmission of SRS.

8. The method of claim 7, wherein deciding whether or not to transmit the SRS is based, at least in part, on the received signaling being valid for a given narrowband region.

9. The method of claim 7, further comprising:
   determining a first set of narrowband regions for which a trigger to transmit SRS is valid;
   determining a hopping sequence of transmission resources;
   determining transmission parameters according to the first set of narrowband regions for which a trigger is valid and the determined hopping sequence; and
   wherein deciding whether or not to transmit the SRS comprises deciding to transmit the SRS in a first subframe of the first set of narrowband regions for which a trigger is valid based, at least in part, on the determined transmission parameters.

10. The method of claim 7, wherein the signaling comprises a downlink grant, and wherein determining the resources for transmitting SRS is based, at least in part, on resources indicated in the downlink grant.

11. The method of claim 7, further comprising:
    receiving a plurality of SRS configurations from a base station;
    receiving a grant from the base station, comprising a trigger to perform SRS and an indication of an SRS configuration of the plurality of SRS configurations to use for transmitting the SRS, and wherein deciding whether or not to transmit an SRS is based, at least in part, on the trigger and the indication of the SRS configuration.

12. The method of claim 1, further comprising:
    receiving a grant from a base station comprising a trigger to perform SRS;
    determining a physical downlink shared channel (PDSCH) reception will collide with the SRS transmission; and
    dropping at least one of the SRS transmission, the PDSCH transmission, or the grant.

13. The method of claim 1, further comprising;
    receiving higher layer information for SRS;
    receiving a grant from a base station comprising a trigger to perform SRS;
    determining transmission parameters based, at least in part, on the higher layer information and the trigger, wherein the higher layer information comprises at least one of a code division multiplexing (CDM) index, a comb index, or a cyclic shift; and
    wherein deciding whether or not to transmit an SRS is based on the determined transmission parameters.

14. The method of claim 13, wherein deciding whether or not to transmit an SRS comprises deciding to transmit the SRS over more than one orthogonal frequency division multiplexing (OFDM) symbol.

15. The method of claim 1, further comprising performing rate matching for a physical uplink channel around a last symbol in the first subframe regardless of the decision of whether or not to transmit SRS on the determined resources of the first subframe, wherein the physical uplink channel is a physical uplink shared channel (PUSCH) or a physical uplink control channel (PUCCH).

16. The method of claim 1, wherein the UE decides not to transmit the SRS on the determined resources of the first subframe, and further comprising:
  determining whether or not to perform rate matching for a physical uplink channel around a last symbol in the first subframe based, at least in part, on whether the SRS is dropped due to a transmission in the first subframe or in a subsequent subframe, wherein the physical uplink channel is a physical uplink shared channel (PUSCH) or a physical uplink control channel (PUCCH).

17. An apparatus for wireless communications, comprising:
  at least one processor configured to:
  determine one or more narrowband regions partitioned from wider system bandwidth for communicating with a base station;
  determine resources, within the one or more narrowband regions of a first subframe, for transmission of sounding reference signals (SRS) by the UE, wherein the resources are determined based, at least in part, on resources used for transmitting a physical uplink shared channel (PUSCH);
  decide whether or not to transmit SRS on the determined resources of the first subframe based, at least in part, on whether the UE has to retune from a first narrowband region of the one or more narrowband regions of the first subframe to a second narrowband region of a second subframe, wherein deciding whether or not to transmit the SRS comprises deciding not to transmit the SRS when a direction of the first subframe is different than a direction of the second subframe; and
  a transmitter configured to transmit or not transmit the SRS on the determined resources of the first subframe based on the decision.

18. The apparatus of claim 17, wherein the at least one processor is further configured to decide whether or not to transmit the SRS based, at least in part, on at least one of a frequency location of the first narrowband region of the first subframe or a frequency location of the second narrowband region of the second subframe.

19. The apparatus of claim 18, wherein the at least one processor is configured to decide not to transmit the SRS if the frequency location of the first narrowband region is different from the frequency location of the second narrowband region.

20. The apparatus of claim 18, wherein the at least one processor is further configured to decide whether or not to transmit the SRS based, at least in part, on an operating mode of the UE, wherein operating modes comprise at least one of a frequency division duplex (FDD) mode or a time division duplex (TDD) mode.

21. The apparatus of claim 20, wherein, for TDD mode, the at least one processor is configured to decide whether or not to transmit the SRS based further based, at least in part, on at least one of a duration of a partial downlink subframe or a duration of a partial uplink subframe.

22. The apparatus of claim 17, wherein the at least one processor is configured to determine the resources based, at least in part, on upper layer information for a subset of narrowbands, comprising one or more of a cyclic shift or a comb index.

23. The apparatus of claim 17, further comprising a receiver configured to receiving signaling to trigger transmission of SRS.

24. The apparatus of claim 23, wherein the at least one processor is configured to decide whether or not to transmit the SRS based, at least in part, on the received signaling being valid for a given narrowband region.

25. The apparatus of claim 23, wherein the at least one processor is further configured to:
  determine a first set of narrowband regions for which a trigger to transmit SRS is valid;
  determine a hopping sequence of transmission resources;
  determine transmission parameters according to the first set of narrowband regions for which a trigger is valid and the determined hopping sequence; and
  decide whether or not to transmit the SRS by deciding to transmit the SRS in a first subframe of the first set of narrowband regions for which a trigger is valid based, at least in part, on the determined transmission parameters.

26. The apparatus of claim 23, wherein the signaling comprises a downlink grant, and wherein the at least one processor is configured to determine the resources for transmitting SRS is based, at least in part, on resources indicated in the downlink grant.

27. The apparatus of claim 23, wherein the receiver is further configured to:
  receive a plurality of SRS configurations from a base station;
  receive a grant from the base station, comprising a trigger to perform SRS and an indication of an SRS configuration of the plurality of SRS configurations to use for transmitting the SRS; and
  wherein the at least one processor is further configured to decide whether or not to transmit an SRS based, at least in part, on the trigger and the indication of the SRS configuration.

28. The apparatus of claim 17, further comprising a receiver configured to receive a grant from a base station comprising a trigger to perform SRS; and
  wherein the at least one processor is configured to:
  determine a physical downlink shared channel (PDSCH) reception will collide with the SRS transmission; and
  drop at least one of the SRS transmission, the PDSCH transmission, or the grant.

29. The apparatus of claim 17, further comprising:
  a receiver configured to:
  receive higher layer information for SRS;
  receive a grant from a base station comprising a trigger to perform SRS; and
  wherein the at least one processor is further configured to:
  determine transmission parameters based, at least in part, on the higher layer information and the trigger, wherein the higher layer information comprises at least one of a code division multiplexing (CDM) index, a comb index, or a cyclic shift; and
  decide whether or not to transmit an SRS based on the determined transmission parameters.

30. The apparatus of claim 29, wherein the at least one processor configured to decide whether or not to transmit an SRS by deciding to transmit the SRS over more than one orthogonal frequency division multiplexing (OFDM) symbol.

31. The apparatus of claim 17, wherein the at least one processor is further configured to perform rate matching for a physical uplink channel around a last symbol in the first subframe regardless of the decision of whether or not to transmit SRS on the determined resources of the first subframe, wherein the physical uplink channel is a physical uplink shared channel (PUSCH) or a physical uplink control channel (PUCCH).

32. The apparatus of claim 17, wherein the apparatus decides not to transmit the SRS on the determined resources of the first subframe, and wherein the at least one processor is configured to determine whether or not to perform rate matching for a physical uplink channel around a last symbol in the first subframe based, at least in part, on whether the SRS is dropped due to a transmission in the first subframe or in a subsequent subframe, wherein the physical uplink channel is a physical uplink shared channel (PUSCH) or a physical uplink control channel (PUCCH).

33. An apparatus for wireless communications, comprising:
- means for determining one or more narrowband regions partitioned from wider system bandwidth for communicating with a base station;
- means for determining resources, within the one or more narrowband regions of a first subframe, for transmission of sounding reference signals (SRS) by the UE, wherein the resources are determined based, at least in part, on resources used for transmitting a physical uplink shared channel (PUSCH);
- means for deciding whether or not to transmit SRS on the determined resources of the first subframe based, at least in part, on whether the UE has to retune from a first narrowband region of the one or more narrowband regions of the first subframe to a second narrowband region of a second subframe, wherein deciding whether or not to transmit the SRS comprises deciding not to transmit the SRS when a direction of the first subframe is different than a direction of the second subframe; and
- means for transmitting or not transmitting the SRS on the determined resources of the first subframe based on the decision.

34. A non-transitory computer-readable medium for wireless communications, comprising code, which when executed by at least one processor, causes the at least one processor to:
- determine one or more narrowband regions partitioned from wider system bandwidth for communicating with a base station;
- determine resources, within the one or more narrowband regions of a first subframe, for transmission of sounding reference signals (SRS) by the UE, wherein the resources are determined based, at least in part, on resources used for transmitting a physical uplink shared channel (PUSCH);
- decide whether or not to transmit SRS on the determined resources of the first subframe based, at least in part, on whether the UE has to retune from a first narrowband region of the one or more narrowband regions of the first subframe to a second narrowband region of a second subframe, wherein deciding whether or not to transmit the SRS comprises deciding not to transmit the SRS when a direction of the first subframe is different than a direction of the second subframe; and
- transmit or not transmit the SRS on the determined resources of the first subframe based on the decision.

* * * * *